(12) United States Patent
Sykora et al.

(10) Patent No.: US 6,634,399 B1
(45) Date of Patent: Oct. 21, 2003

(54) TIRE WITH PEN REINFORCEMENT

(75) Inventors: James Cletus Sykora, Uniontown, OH (US); Walter Kevin Westgate, Uniontown, OH (US); Charles Elmer Hamiel, Stow, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/763,534

(22) PCT Filed: Sep. 15, 1998

(86) PCT No.: PCT/US98/19079

§ 371 (c)(1),
(2), (4) Date: Feb. 19, 2001

(87) PCT Pub. No.: WO00/15449

PCT Pub. Date: Mar. 23, 2000

(51) Int. Cl.[7] .............................. B60C 9/00; B60C 9/02; D02G 3/00; D02G 3/48
(52) U.S. Cl. ................... 152/556; 152/451; 152/548; 57/902; 428/357; 428/364; 428/395
(58) Field of Search .......................... 152/451, 527, 152/556, 548, 526; 428/395, 357, 364, 365; 57/902

(56) References Cited

U.S. PATENT DOCUMENTS

| | | | | |
|---|---|---|---|---|
| 3,481,136 A | * | 12/1969 | Timmons | 264/130 |
| 3,617,352 A | * | 11/1971 | Shima et al. | 428/423.7 |
| 3,625,271 A | * | 12/1971 | Hutch | 152/540 |
| 3,929,180 A |   | 12/1975 | Kawase et al. | 152/359 |
| 4,273,177 A | * | 6/1981 | Nybakken | 152/528 |
| 4,763,468 A | * | 8/1988 | Brown et al. | 264/210.7 |
| 5,192,380 A | * | 3/1993 | Hanada et al. | 152/454 |
| 5,397,527 A | * | 3/1995 | Rim et al. | 264/210.8 |
| 6,082,423 A | * | 7/2000 | Roesgen et al. | 152/209.1 |

FOREIGN PATENT DOCUMENTS

| | | | |
|---|---|---|---|
| GB | 1310316 | 3/1973 | B60C/9/20 |
| WO | 9006383 | 6/1990 | D01F/6/62 |
| WO | 9814336 | 4/1998 | B60C/9/00 |

* cited by examiner

Primary Examiner—Michael W. Ball
Assistant Examiner—Justin Fischer
(74) Attorney, Agent, or Firm—David E. Wheeler; Nancy T. Krawczyk

(57) ABSTRACT

High modulus reinforcement is used to make a radial ply pneumatic tire having only one carcass ply, i.e. a monoply tire. Poly-ethylene naphthalate (PEN) reinforcement is prepared in a manner that provides sufficient strength whereby the monoply tire can be made having reduced weight (as compared to a two ply tire) while having comparable durability, some improved handling, reduced rolling resistance, and improved flatspotting properties.

5 Claims, 2 Drawing Sheets

TIRE WITH PEN REINFORCEMENT

TECHNICAL FIELD

The invention relates to radial ply pneumatic tires.

BACKGROUND ART

It is a continuing goal in the art to reduce tire weight, and the amount of material in a tire without reducing performance characteristics. In the past, attempts have been made to reduce the number of carcass plies used in passenger tires from two plies to one ply by using larger and stronger carcass ply reinforcement cords. Although such monoply tires perform as well as the two ply tires for many tire properties, such monoply tires have shown major distortion in the areas of the tire coinciding with overlap splices. Apparently, in a two-ply tire the plies support each other and such distortion is not a major problem.

The challenge in producing a monoply tire, therefore, is to find materials or a tire construction that is not susceptible to such distortions, while other properties are maintained.

DISCLOSURE OF INVENTION

A pneumatic tire of the invention comprises a pair of parallel annular beads, a single carcass ply comprising poly(ethylene 2–6 naphthalene dicarboxylate) reinforcement cords wrapped around the beads, a belt package disposed radially outward of the carcass ply in a crown area of the tire, tread disposed radially outward of the belt package, and sidewalls disposed between the tread and the beads. The PEN reinforcement in the carcass ply comprises 2000 to 8000 dTex cords having a twist multiplier of 5 to 10, said cords showing a shrinkage of 2.5% to 7%, a LASE @ 5% of 85 to 115 N. a break strength of 200 to 350 N, a 90% to 100% Retained break strength based on the Dynamic Flex Fatigue test, and a cord density of 20 to 40 ends per inch (e.p.i. measured at tire bead).

In an illustrated embodiment, the reinforcement in the carcass ply comprises 1100/1/3 dTex PEN cords with a 394 turns per meter Z×394 turns per meter S twist, said cords showing a 3.2% shrinkage, 99 N LASE @ 5%, 252 N break strength, and 94% Ret BS Dynamic Flex Fatigue.

In the illustrated embodiment, the carcass ply is reinforced with 1100/1/3 PEN cords at a cord density of 26 to 30 e.p.i. (as measured at tire bead), said cords having an angle of 75° to 90° with respect to the equatorial plane of the tire.

DETAILED DESCRIPTION OF THE INVENTION

Figure 1:
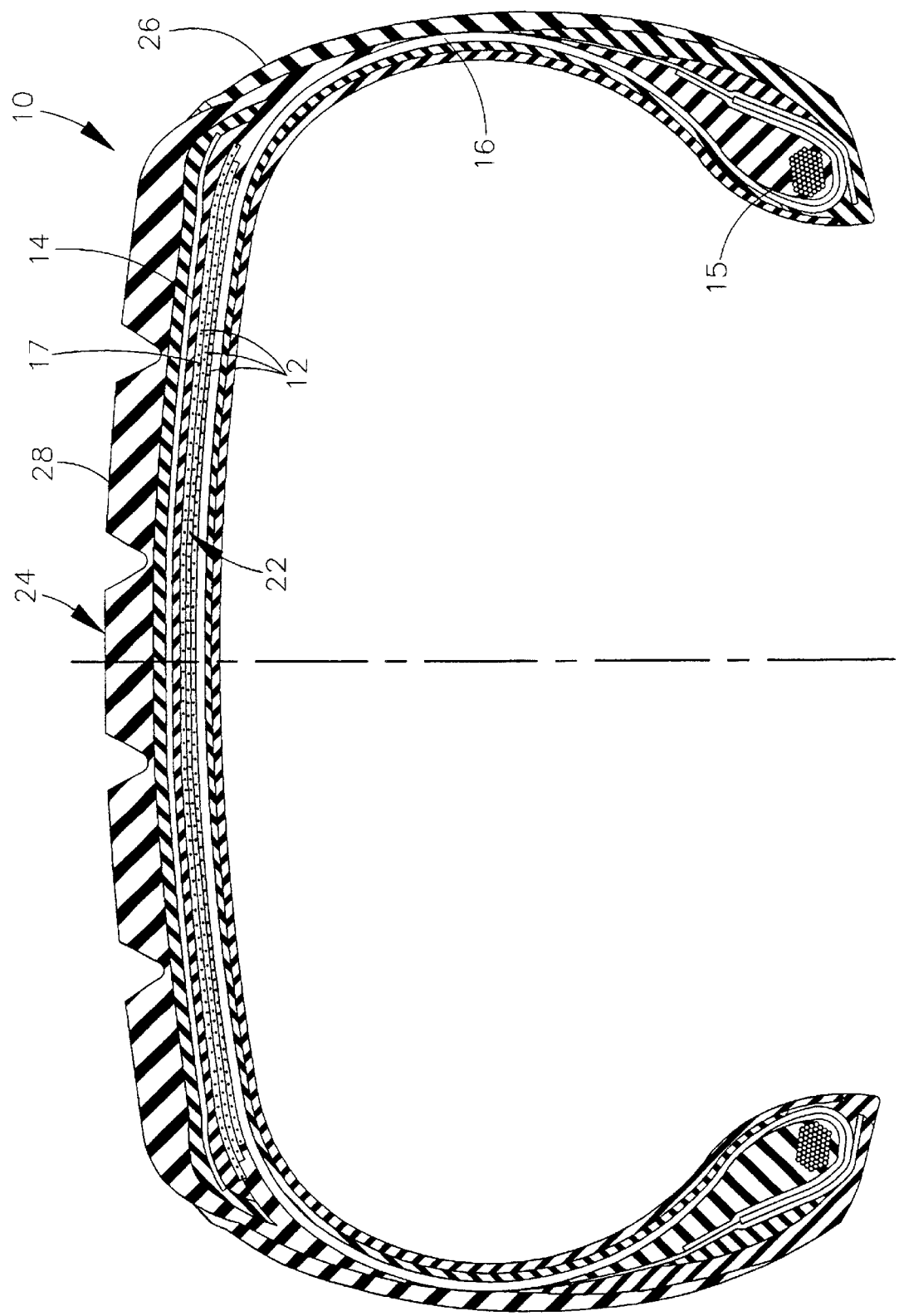
FIG. 1 is a cross-section of a tire of the invention.

With reference now to FIG. 1, a tire 10 of the invention comprises a single carcass ply 16 wrapped around a pair of parallel annular beads 15, belt reinforcement 22 disposed over the carcass ply 16 in a crown portion 24 of the tire, tread 28 disposed over belt reinforcement 22 and sidewalls 26 disposed between tread 28 and beads 15. The belt reinforcement 22 may vary according to the size and design of the tire, and in the embodiment illustrated in the drawing comprises belts 12, a gum rubber cushion layer 17, and an overlay 14.

The present inventors have found that PEN cords show heightened process sensitivity to twisting and treating conditions. By increasing the tension on the cords during dipping in an adhesive (typically an RFL latex adhesive) when the proper twist multipliers are used, the treated cord tenacity increases. In addition, more uniform (i.e. more reproducible) PEN treated cord tensile properties are obtained.

In the illustrated embodiment, a PEN yarn available from Allied Signal designated PENTEX 1P70, experimental code A701 (poly(ethylene-2,6-naphthalene dicarboxylate)) was treated by The Goodyear Tire & Rubber Company using special tensions and twisting. The inventors speculated that the properties of the PEN yarn, together with the proper pretreatment, would provide cords suitable for reinforcement cords in a carcass ply to be used in a monoply tire.

The test cord construction chosen for first iteration testing was 1100 dTex/1/3 cord having a twist of 394Z×394S where the twist is given in turns per meter (tpm).

Figure 2:
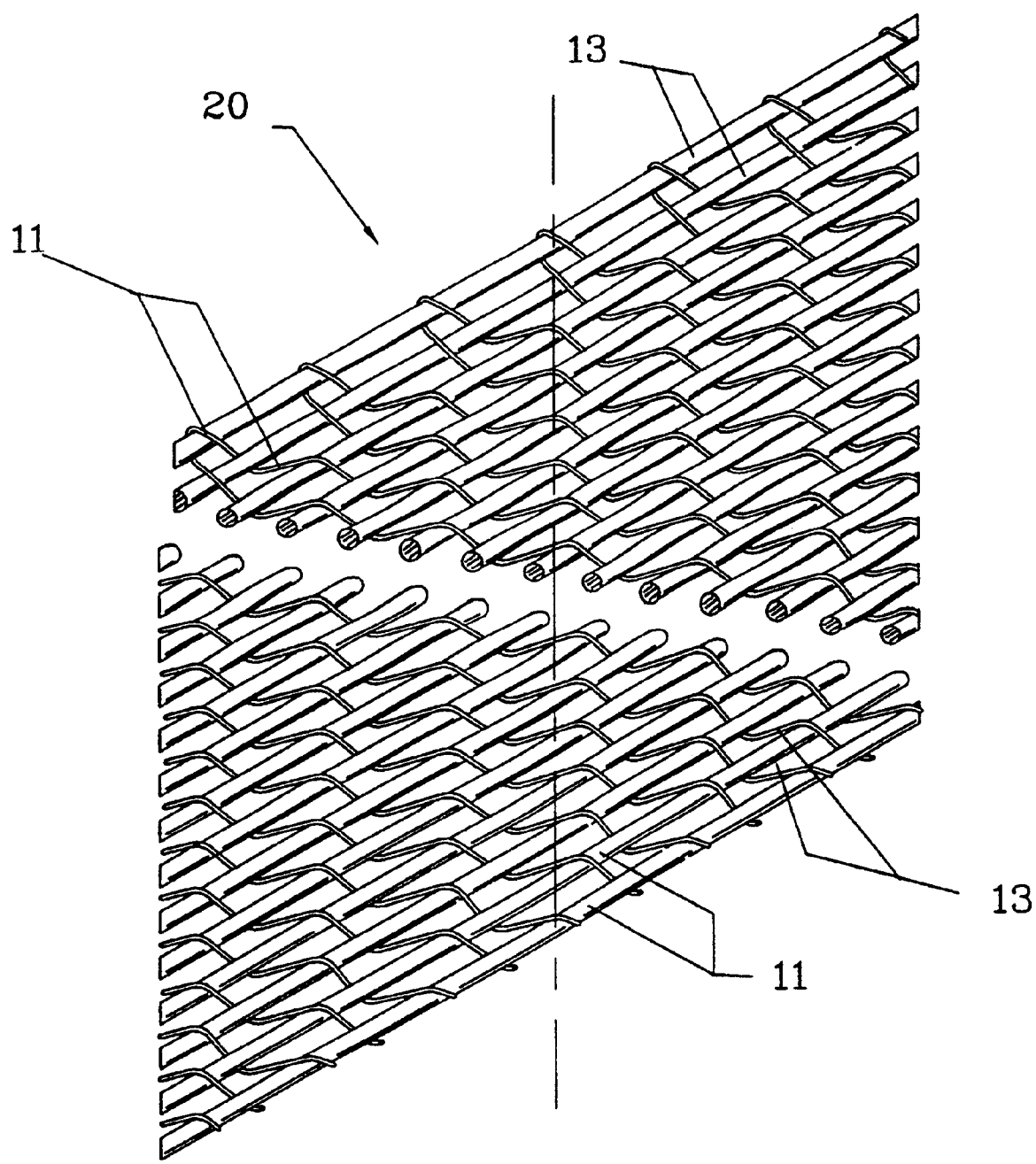
FIG. 2 is a perspective view of a reinforcement ply used in the tire of the invention.

With reference now to FIG. 2, and as is known to those skilled in the art, the cords are generally woven into a textile fabric 20 for treatment, and the weft cords 13 of the textile fabric are broken or otherwise removed before the warp cords 11 are calendered into a ply, for example as illustrated in PCT/US 97/06757 filed Apr. 18, 1997.

The PEN cords used in the invention were prepared using basically the same techniques described in the above application.

In the illustrated embodiment, the twisted cords were dipped twice in an RFL epoxy adhesive. In the first dip, the cords were subjected to a minimal tension to permit good penetration of the adhesive into the cords. After dipping the cords were passed through vacuum, by radiant heaters and dryers to reduce the fluidity of the adhesive, and onto a first major pull roll. After passing the first pull roll, the tensions applied by a second pull roll, about 1500–3200 lbs (560–1195 kg), in the illustrated embodiment 2000–2600 lbs (746.5–970 kg), act on the cord as the cord passes through the set point in an oven. Thereafter, a third pull roll applies a tension of 1500–3200 lbs (560–1195 kg), in the illustrated embodiment 1800–2400 lbs (670–895 kg), as the cord enters a second adhesive dip and continues through vacuum, radiant heaters, drying ovens;:and cooling chambers and through the second set point in the oven, and to the third pull roll. Thereafter, the windup roll pulls the cord, using minimal tension, thereon for storage.

Set temperatures in the ovens may be 220 to 265° C. depending on the adhesive used. Residence times may vary from 30 seconds to 120 seconds depending on the temperature and the adhesive used. The drying zone primarily reduces the fluidity of the adhesive so the adhesive sticks to the cord as it is transported by the vacuum and over the rolls, and the temperature in the drying zone (usually about 100 to 170° C.) is sufficient for this purpose. In the illustrated embodiment where an RFL epoxy adhesive was used, tensions in the first drying zone were maintained at 1000 lbs for 60 seconds residence at 140° C.

Those skilled in the art will recognize that tension, residence times and temperatures may be varied within reasonable limits.

The illustrated 1100 dTex/1/3 PEN filaments/cords 1100/1/3 394Z×394S, show a T-Shrinkage of 3.2% a LASE @ 5% of 99N, a break strength of 252N, and a Dynamic Flex Fatigue (1" spindle) of 94% Ret BS (Retained Break Strength). LASE is short for Load at Specified Elongation.

It is believed that PEN cords having a linear density of 2000 to 8000 dTex and a twist multiplier of 5 to 10, and showing a shrinkage of 2.5% to 7%, a LASE @ 5% of 85 to 115 N, a break strength of 200 to 350 N, and a 90% to 100% Retained break strength based on the Dynamic Flex Fatigue test, can be used in the invention. Such cords would be used in a monoply carcass at a cord density of 20 to 40 ends per inch (e.p.i. measured at tire bead).

The heavier dTex cords, 4000 to 8000 dTex are believed to be most applicable to light truck and medium truck tires, and the lower dTex cords, 2000 to 4000 dTex, are believed to be most applicable to passenger car tires, although those skilled in the art will recognize that there may be some overlap in the ranges.

As described herein, unless otherwise indicated, cord linear densities are given in dTex and the twists (Z,S) are given in turns per meter. As is conventional in the art, Z denotes a left hand twist and S denotes a right hand twist, and the first number in the twist part of the construction is the twist of the yarn (sometimes referred to as ply) and the second number is the twist of the cord (sometimes referred to as the cable twist).

It is believed that tires of the invention will have suitable properties when the cord has a twist multiplier (TM) of 5–10, preferably 6–9. The TM is defined by the formula $$TM = ((tpm \times 0.0254) \times (dTex/1.111))/73$$

where dTex represents the linear density of the bulk greige yarn.

Yarn twists and cable twists can be the same or different and can be from 118 tpm to 630 tpm depending on the linear density or the dTex of the yarn, and the limitation that the cord twist multiplier be 5–10.

While evaluating cords made using the PEN material, it was found that PEN material is more sensitive to compression fatigue than PET (polyethylene terephthalate) polyesters when compared on an equal construction basis. Based on this observation, the inventors knowledge of tire durability requirements, and more intensive fatigue screening, it was predicted that if a PEN cord (constructed as: 1100/1/3) was subjected to additional twisting (e.g.394×394 tpm in place of (ipo) typically 335×335 tpm), such a PEN cord could withstand the additionally applied stresses encountered by the reinforcement cords in a large monoply (ipo 2-ply) passenger/RLT tire.

The cord construction of the invention, coupled with PEN's inherent properties, makes it possible to reduce ply count on the current 2-ply passenger and RLT tires to a single ply. The resulting effect is a tire that shows comparable durability, equivalent sidewall indentation growth, and improved handling over a comparable 2-ply PET polyester carcass reinforced tire. In addition, the overall tire weight is reduced, which may provide additional benefits such as lower rolling resistance, lower flat spotting, and reduced "Give Up".

A typical PET polyester reinforcement is constructed as an 1100/1/3, 335Z×335S tpm cord for use in monoply passenger and 2-ply RLT tires.

A typical 2-ply passenger tire uses a 1100/1/2, 472Z×472S tpm cord PET construction to achieve the level of carcass durability required.

Accordingly, it was also predicted that if PET polyester is constructed as a 1100/1/3 394Z×394S tpm cord, the durability would be satisfactory, but the resultant tire uniformity (e.g. SWI) and performance (i.e. handling, give-up) would be poorer than that seen in a similar two-ply tire. The illustrated 1100/1/3, 394Z×394S tpm PEN cord provides equal durability and a higher modulus than the comparable PET cords.

Sample tires made using the PEN cords were equivalent to the prior art two ply tires for most parameters, yet did not exhibit sidewall distortion around the splices as was seen in other attempts at building monoply tires using PET. And surprisingly, the tires of the invention showed enhanced wet handling properties, and reduced harshness and improved handling properties. These results are encouraging, considering that the tires were not optmized for the monoply construction but were made close to the specifications of the prior art two ply tires.

The invention is further illustrated with reference to the following examples.

EXAMPLE 1

This example shows the evaluation of Allied PENTEX IP70 PEN as Ply and Overlay in a P215/60R16 Invicta GA(L) tire. Allied PENTEX is a polyethylene naphthalate (PEN) which was used to make a tire cord that has superior strength, LASE, and dimensional stability as compared to conventional polyethylene terephthalate (PET) tire cords. Tire evaluations were carried out on the P215/60R16 Invicta GA(L), since this is a speed rated tire that is aimed at the luxury market, and provides a good test-bed for measuring potential improvements of high speed, ride, handling, flatspotting, and sidewall undulations.

The following constructions were evaluated:

| CONSTRUCTION | PLY | OVERLAY |
|---|---|---|
| 40A | (1100/2 PET) | (940/2 NYLON) |
| 41A | (1100/2 PEN) | (940/2 NYLON) |
| 42A | (1100/2 PET) | (1100/2 PEN) |
| 43A | (1100/2 PEN) | (1100/2 PEN) |

SUMMARY

1. Tire uniformity was comparable for all construction variations.

2. Durability evaluations showed mixed results on DOT High Speed testing with all tires having a similar failure mode of button chunking and shoulder lug separations. DOT Endurance had all tires stop finish, as did the Outdoor resiliometer (with 43A stopped early to facilitate getting cord samples in time to meet program deadlines). Extracted cord analysis did not indicate any loss of durability.

3. Force and Moment showed all constructions to be comparable.

4. Static Measurements showed all constructions to have comparable footprints, loading, and dimensions.

5. Subjective Harshness showed all constructions to be marginally down up to 0.5 point.

6. Subjective Wet Handling showed all PENTEX constructions to give improved elapsed times, with the PENTEX overlay constructions having quickest times and best overall response characteristics.

7. ATE evaluations were done with the PENTEX as ply and as overlay. All constructions stop/finished, with no constructions showing excessively high holographic ratings. Accompanying cord analysis did not show any loss in cord strengths.

8. Sidewall undulation measurements were evaluated utilizing a Banzai gauge. However, the 2-ply tire construction was so 'robust' that no undulations were ever observed (for either the PET or PEN constructions), even after over-inflating the tires and subjecting them to a one-week oven soak.

SUMMARY

1. No durability loss was seen in any of the PENTEX tests conducted in this tire evaluation.

2. PENTEX PEN may further contribute to reduction of flatspotting.

OBSERVATIONS

1. Since measurement of sidewall undulations did not show any significant change (either for control or experimental constructions), it appears that the PENTEX PEN would be useful either in a higher pressure RLT construction or in a conventional monoply passenger construction (higher aspect ratio).

2. Possibly a high performance construction with the optimization of the 1100/1/2 PENTEX PEN cord construction would take advantage of the increased strength and LASE at a lower EPI.

Some of the data in the tables below use normalized values where the control is equal to 100. A number less than 100 indicates properties inferior to the control, and number above 100 indicates properties superior to the control, except for weight data and flatspotting data, unless indicated otherwise.

TABLE I

P215/60R16 Invicta GAL (IGAL)

| | 40A | 41A | 42A | 43A |
|---|---|---|---|---|
| uniformity | | | | |
| RFV | 100 | 80 | 93 | 94 |
| R1H | 100 | 65 | 88 | 84 |
| durability-FMVSS 109 DOT High Speed (Fed. Govt. A-grade = 527.5 mi) | | | | |
| Miles | 807 | 927 | 726 | 805 |
| | 801 | 925 | 754 | 786 |
| FMVSS-109 DOT ENDURANCE, EXTENDED, QC CERTIF. (2145 mi to pass) | | | | |
| Miles | 2152 | 2162 | 2165 | 2154 |
| | 2154 | 2145 | 2145 | 2191 |
| OUTDOOR RESILOMETER, 55 MPH | | | | |
| rating | 100 | 101 | 101 | 95 |
| Plunger energy certification--FMVSS-109 | | | | |
| rating | 100 | 97 | 103 | 94 |
| FORCE AND MOMENT (100% TRA load @207 Kpa) | | | | |
| cornering coeff. | 100 | 99 | 102 | 99 |
| aligning torque | 100 | 101 | 100 | 102 |

EXAMPLE 2

This example provides an evaluation of Monoply PEN and PET Materials ipo 2-Ply PET in a P225/75R15 Invicta GS (IGS).

As the tire size increases, the material demands for strength and dimensional stability are pushed to higher levels. To evaluate both constructional and material changes needed to replace the conventional 2-plies reinforced with 1100/1/2 472Z×472S PET cords (P225/75R15 Invicta GS) with a monoply construction, a monoply reinforced with 1440/1/3 315Z×315S PET cords was used to construct an otherwise identical tire. For the material evaluation, a monoply reinforced with 30 EPI 1100/1/3 394Z×394S PEN cords (polyethylene naphthalate cord material from AlliedSignal) was used in place of the conventional 2-plies reinforced with 1100/1/2 PET cords. 1440/1/3 PET cords are a readily available material that is used extensively in RLT applications. The 1100/1/3 PEN (Allied PENTEX) is a material having increased strength and dimensional stability over conventional PET. Upon completion of durability testing, tires were sampled to obtain residual cord property analysis.

SUMMARY

1. Prior evaluation of PEN indicated potential for utilization as a monoply tire material. A readily available 1440/1/3 PET cord was also evaluated.

2. Tires were intentionally built with multiple builder splices of 1/2", 3/4" and 1"and were tested for sidewall undulations. Testing showed that conventional 1440/1/3 PET was consistent with previous PET monoply evaluations in that it had almost twice the indentation as a 2-ply tire. The PEN on the other hand, matched the 2-ply PET undulation while still utilizing a monoply construction. This testing was dramatically exaggerated since it was run after inflating the tires at 55 PSI for 7 days.

3. Uniformity data showed both monoply constructions to be slightly higher for all measured parameters. However, these tires were not tuned, but merely represented an 'as is' first attempt construction. Sampling showed that a weight savings of almost one pound could be realized with either monoply construction.

4. Static Measurement data showed very comparable deflection and footprint measurements for the monoply vs the 2-ply constructions.

5. DOT comparisons showed the monoply and 2-ply tires to perform comparably. Plunger energy for the 1440/1/3 was slightly higher than the 2-ply control, while the PEN monoply construction was comparable to the two ply control.

6. Bead durability (W14) and ODR were inconsistent but tended to show monoply constructions down slightly.

7. ATE testing showed all constructions to be comparable as measured by holography. Residual cord pull testing indicated that both the PET and PEN monoply materials had retained sufficient strength consistent with previous testing of both 2-ply and monoply materials.

8. Wet and Dry Subjective Handling showed both monoply constructions to perform adequately versus the 2-ply control, with the PEN having a distinct advantage, especially in the wet.

9. Subjective Noise, Harshness, and Handling tests again showed the PEN monoply to outperform the 2-ply control, while the PET monoply was equivalent to the control.

10. ECE High Speed had the PEN down one speed step while the PET was comparable to the 2-ply control (this program represents a first iteration test with no tire tuning).

11. Rolling Resistance was comparable for all constructions.

12. Force and Moment testing showed both monoply constructions to have a higher aligning torque and cornering coefficient, which would indicate potential for improved handling. This was proved to be the case as exhibited in ride testing results.

13. A slight improvement was seen for flatspotting for the monoply constructions.

14. Sidewall penetration (a concern with larger size monoply tires) was evaluated using the Smithers Sidewall Pendulum test, and showed the monoply constructions to be comparable to the 2-ply control. The 1440/1/3 PET did in fact exceed the 2-ply tire for sidewall impact durability.

15. Burst testing showed the monoply constructions to exceed the 2-ply control.

CONCLUSIONS

1. From a durability standpoint, both the 1440/1/3 PET and the 1100/1/3 PEN performed comparable to the 2-ply control.

2. Sidewall indentation testing with 'exaggerated' splices showed the monoply PEN to be comparable to the 2-ply control. The 1440/1/3 PET, however, exhibited typical indentations seen with other monoply PET constructions.

3. Ride and Handling data show both monoply construction to perform satisfactorily as compared to the 2-ply control, with the 1100/1/3 PEN having a distinct advantage in Subjective Wet, Subjective Harshness, and Subjective Handling over the 1100/1/2 2-ply control.

4. Sidewall impact does not appear to be an issue for either monoply material, as measured by the Smithers Sidewall Pendulum test.

TABLE 2

| P225/75R15 IGS | 20A | 21A | 22A |
|---|---|---|---|
| PLY CONSTRUCTION | 2 PLY | MONOPLY | MONOPLY |
| PLY TYPE | 1100/1/2 PET | 1100/1/3 PEN | 1440/1/3 PET |
| UNIFORMITY DATA | | | |
| Weight | 100 | 96 | 97 |
| RFV | 100 | 109 | 117 |
| R1H | 100 | 116 | 111 |
| STATIC MEASUREMENTS DEFLECTION/LOAD | | | |
| 26 PSI | = | = | = |
| 35 PSI | = | = | = |
| 60 PSI | = | = | = |
| FOOTPRINT MEASUREMENTS | | | |
| AREA (Gross/Net) | = | = | = |
| LENGTH (Max/Centerline) | = | = | = |
| WIDTH (Max/Centerline) | = | = | = |
| DOT ENDURANCE | | | |
| MILES | 2145 | 2145 | 2148 |
|  | 2145 | 2145 | 2201 |
| FMVSS-109 & 119 UTQGL HIGH SPEED | | | |
| Miles | 529 | 502 | 540 |
|  | 541 | 532 | 532 |
| PLUNGER ENERGY CERTIFICATION | | | |
| relative energy | 100 | 95 | 130 |
| DURABILITY DATA | | | |
| OUTDOOR RESILIOMETER, 55 MPH | 100 | 87 | 76 |
| GRAVELWHEEL | 100 | 100 | 100 |
| BEAD DURABILITY | 100 | 67 | 67 |
| ATE | = | = | = |
| FRONTS (@36 K miles) | = | = | = |
| REARS (@36 K miles) | = | = | = |
| DRY HANDLING | = | = | = |
| AVE. LAP TIME | 56.96/56.84 | | |
| SUBJECTIVE WET HANDLING | = | = | = |
| AVE. LAP TIME | 60.11 | 59.81 | 59.97 |
| SUBJECTIVE NOISE | = | = | = |
| SUBJECTIVE HARSHNESS | = | + | + |

TABLE 2-continued

| SUBJECTIVE HANDLING | = | + | + |
|---|---|---|---|
| ECE HIGH SPEED (steps) | = | −1 | = |
| ROLLING RESISTANCE | 100 | 99 | 100 |
| FORCE & MOMENT (100% TRA load @207 Kpa) | | | |
| cornering coefficient | 100 | 102 | 101 |
| aligning torque | 100 | 102 | 101 |
| FLATSPOTTING | 100 | 76 | 84 |
| 1-Min | 100 | 75 | 75 |
| 2-Min | 100 | 71 | 82 |

| X99A - SMITHERS SIDEWALL PENDULUM DROP TEST | | | |
|---|---|---|---|
| P225/75R15 IGS | 20A | 21A | 22A |
| P225/75R15 IGS | 20A | 21A | 22A |
| Pendulum Ht (mm) | | | |
| 100 | O O O D | O O O O | O O O O |
| 200 | D O D D | D O D O | O O D D |
| 300 | D D D D | D D D D | D D D D |
| 400 | X X X X | X X X X | X D D D |
| 500 |  |  | D D D |
| 600 |  |  | D D X |
| 700 |  |  | X X |

(Note: 4 tires/constn tested
O = No Damage
D = Damage
X = Burst

While the invention has been variously illustrated and described, those skilled in the art will recognize that the invention can variously modified and practiced without departing from the spirit of the invention. The invention is limited only by the scope of the following claims.

What is claimed is:

1. A pneumatic tire comprising a pair of parallel annular beads, a single carcass ply comprising polyethylene naphthalate (PEN) reinforcement cords wrapped around said beads, a belt package disposed radially outward of said carcass ply in a crown area of the tire, tread disposed radially outward of said belt package, and sidewalls disposed between said tread and said beads, wherein said PEN reinforcement in said carcass ply comprises 2000 to 8000 dTex cords having a twist multiplier of 5 to 10, said cords showing a shrinkage of 2.5% to 7%, a LASE @ 5% of 85 to 115N, a break strength of 200 to 350 N, a 90% to 100% Ret BS Dynamic Flex Fatigue, and a cord density of 25 to 40 ends per inch (e.p.i. measured at tire bead).

2. A pneumatic tire comprising a pair of parallel annular beads, a single carcass ply comprising poly(ethylene 2–6 naphthalene dicarboxylate) reinforcement cords wrapped around said beads, a belt package disposed radially outward of said carcass ply in a crown area of the tire, tread disposed radially outward of said belt package, and sidewalls disposed between said tread and said beads, wherein said reinforcement cords in said carcass ply comprise 1100/1/3 dTex cords with a 394 turns per meter Z×394 turns per meter S twist, and a cord density of 25 to 40 ends per inch (e.p.i. measured at tire bead), said cords showing 3.2% shrinkage, 99 N LASE @ 5%, 252 N break strength, and 94% Ret BS Dynamic Flex Fatigue.

3. The pneumatic radial tire of claim 2 wherein said carcass ply is reinforced cords at a cord density of 26 to 30 (e.p.i. measured at tire bead), said cords having an angle of 75° to 90° with respect to the equatorial plane of the tire.

4. A cord for reinforcing a pneumatic tire wherein said cord comprises 2000 to 8000 dTex PEN having a shrinkage of 2.5% to 7%, a LASE @ 5%-of 85 to 115N, a break strength of 200 to 350 N. wherein said cord is dipped with an adhesive and is pared with a twist multiplier of 5 to 10, and has a 90% to 100% Ret BS Dynamic Flex Fatigue.

5. The cord of claim 1 wherein said PEN is poly(ethylene 2–6 naphthalene dicarboxylate).

* * * * *